United States Patent [19]
Park et al.

[11] Patent Number: 5,793,407
[45] Date of Patent: Aug. 11, 1998

[54] METHOD AND APPARATUS FOR FORMING A LIGHT SPOT SMALLER THAN A THEORETICAL LIMIT FOR HIGH DENSITY RECORDING

[75] Inventors: Tae-seok Park, Suwon; Chul-woo Lee; Jang-hoon Yoo, both of Seoul, all of Rep. of Korea

[73] Assignee: Samsung Electronics Co., Ltd., Suwon, Rep. of Korea

[21] Appl. No.: 507,914

[22] Filed: Jul. 27, 1995

[30] Foreign Application Priority Data

Dec. 26, 1994 [KR] Rep. of Korea ............. 94-36890

[51] Int. Cl.$^6$ ........................................... B41J 2/47
[52] U.S. Cl. ..................... 347/258; 347/241; 359/566
[58] Field of Search ........................ 347/258, 256, 347/241, 134; 359/566, 641, 719, 742

[56] References Cited

U.S. PATENT DOCUMENTS

| | | |
|---|---|---|
| 4,712,885 | 12/1987 | Dawson et al. |
| 4,843,227 | 6/1989 | Matsui et al. |
| 5,148,317 | 9/1992 | Foresi |
| 5,272,501 | 12/1993 | Nishi et al. ............ 356/401 |
| 5,502,001 | 3/1996 | Okamoto |
| 5,524,018 | 6/1996 | Adachi |
| 5,526,338 | 6/1996 | Hasman et al. |
| 5,565,986 | 10/1996 | Knuttel |
| 5,615,199 | 3/1997 | Tatsuno et al. |
| 5,621,717 | 4/1997 | Finkelstein et al. |

FOREIGN PATENT DOCUMENTS

| | | |
|---|---|---|
| 0 492 844 A2 | 7/1992 | European Pat. Off. |
| 59-104762 | 6/1984 | Japan |
| 61-236032 | 11/1986 | Japan |
| 61-251465 | 11/1986 | Japan |
| 64-21727 | 1/1989 | Japan |
| 2-306440 | 12/1990 | Japan |
| 5-72497 | 3/1993 | Japan |
| 5-303755 | 11/1993 | Japan |
| 6-176373 | 6/1994 | Japan |
| 6-203406 | 7/1994 | Japan |

*Primary Examiner*—Mark J. Reinhart
*Attorney, Agent, or Firm*—Burns, Doane, Swecker & Mathis, L.L.P.

[57] ABSTRACT

A high density recording method for performing high density recording by reducing a light spot size in an optical pickup for recording information by scanning an optical disk with the light spot, spatially controlling the phase or the intensity of light being focused within the optical focal length of an objective lens by employing a diffraction optical element so as to form on the optical disk a light spot whose diameter is reduced according to the width of the portion for controlling the phase or intensity of the light. The distribution of the optical intensity is variable depending on the distance between the diffraction optical element and the optical disk, to thereby enable theoretically forming a limitlessly small light spot, and actually, greatly increase the recording capacity. The diffraction optical element can be used as a floating slider in an optical pickup having a swing arm.

20 Claims, 8 Drawing Sheets

FIG. 2A

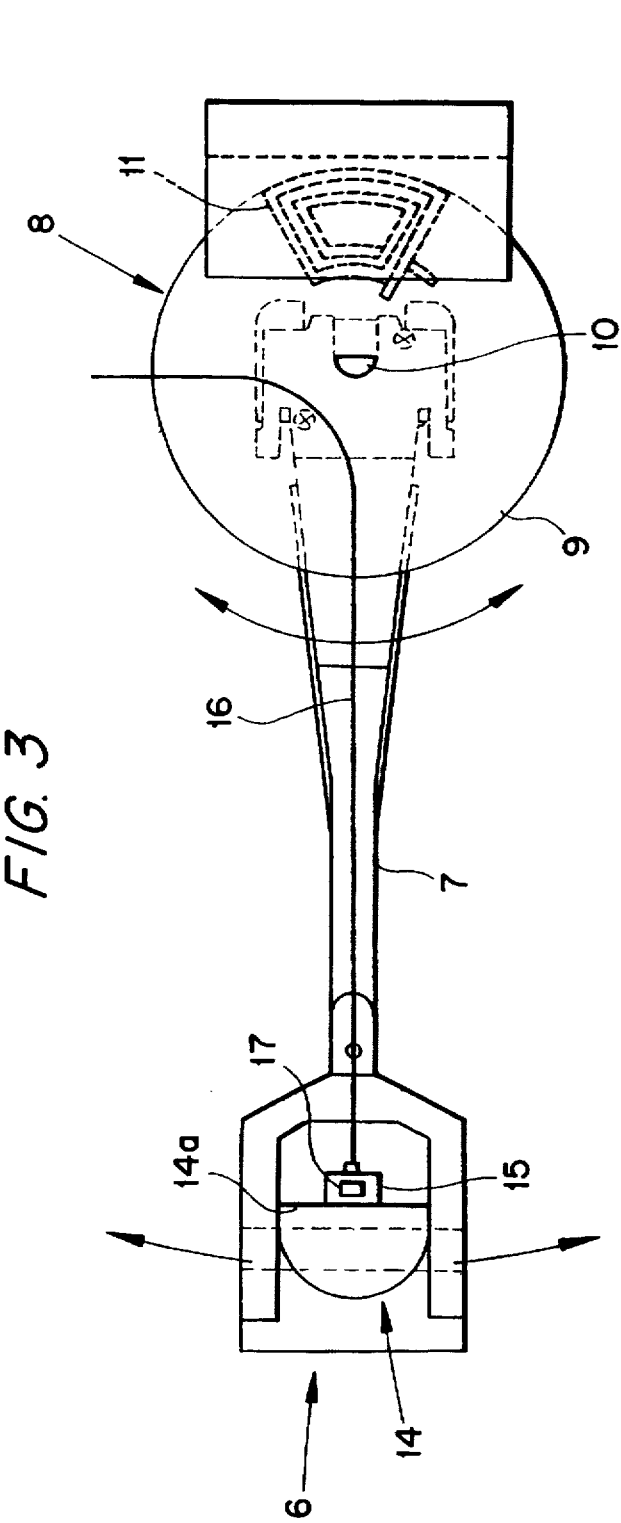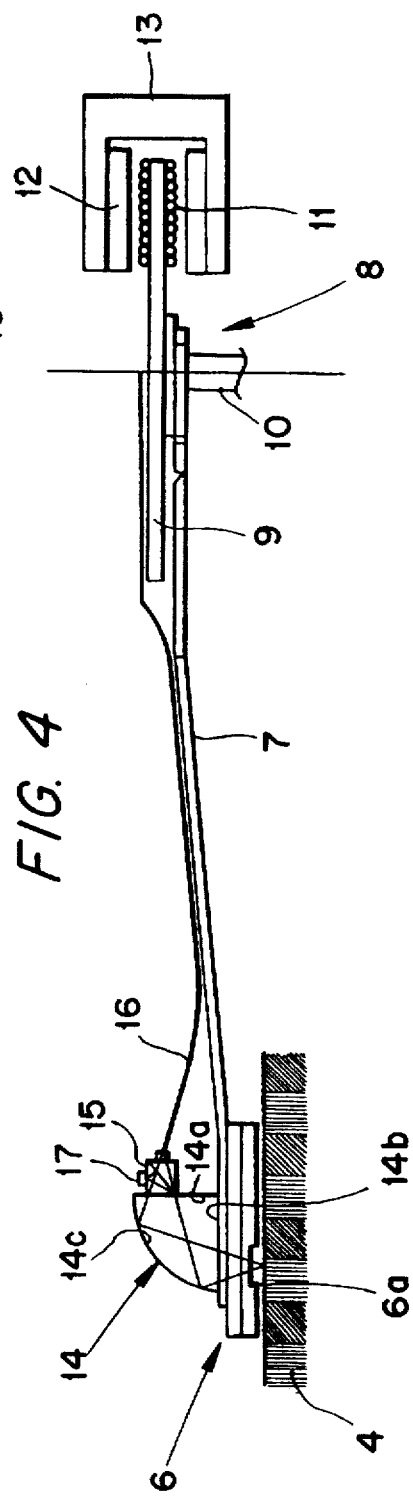
FIG. 3
FIG. 4

METHOD AND APPARATUS FOR FORMING A LIGHT SPOT SMALLER THAN A THEORETICAL LIMIT FOR HIGH DENSITY RECORDING

BACKGROUND OF THE INVENTION

The present invention relates to a high density optical recording method for performing high density recording by reducing the light spot size, in an optical pickup device for scanning an optical disk with the light spot for information recording, and an apparatus adopting the same.

As a method for performing high density optical recording, there is a method for reducing the size of the light spot formed on an optical disk by an objective lens of an optical pickup for use in recording and reproducing. When parallel light is focused by a lens, the light spot at the lens focus has a reduction limit at the point focusing, so that it forms a so-called beam waist. Such a phenomenon is caused by lens aberration. Since light has a wave characteristic to be diffracted, light spot size has a reduction limit even when focused by a lens having no aberration due to the diffraction characteristic. The light spot can be reduced to some extent using a lens having a large numerical aperture, or a short-wave light source. However, such reduction is also limited.

As a method for reducing an light spot, a conventional technique for installing a shielding plate for partially shielding an incident light or a phase apodizer for partially changing the phase of the incident light at the light entrance side of an objective lens, is widely used.

FIG. 1 shows a conventional method for reducing an light spot size by employing a shielding plate. Light generated from a light source 1 is collimated by a collimating lens 2 and is formed as a light spot onto an optical disk 4 by an objective lens 3. A shielding plate 5 is installed between collimating lens 2 and objective lens 3 to shield the central portion of the light reaching objective lens 3. The peripheral portion of the light passing shielding plate 5 is formed as a light spot one optical disk 4 by objective lens 3. Such a method utilizes Fraunhoffer diffraction, and forms a light spot whose size is reduced in proportion to the amount of light reduction by shielding plate 5. However, in the above-described conventional method, the reduction rate of a light spot is no more than 70% to 80%, which gives of enhancement on a higher density recording. In addition, a large quantity of light is wasted.

SUMMARY OF THE INVENTION

Accordingly, it is an object of the present invention to provide a high density optical recording method for further focusing a light focused at a diffraction limit by utilizing the Fresnel diffraction phenomenon to form a light spot whose size is remarkably reduced, and an apparatus adopting the same.

It is another object of the present invention to provide a high density recording method for reducing a light spot size with less optical waste, and an apparatus adopting the same.

To accomplish the object of the present invention, there is provided a high density optical recording method for performing a high density optical recording by focusing light from a light source using an objective lens to form a light spot on an optical recording medium, the method comprising the step of diffracting the light being focused by the objective lens-by employing a diffraction optical element for controlling one of the phase and the intensity of the light being focused by the objective lens.

To accomplish the above object of the present invention, there is provided a high density optical recording apparatus including a light source and an objective lens for focusing the light generated from the light source onto an optical recording medium, the optical recording apparatus comprising a diffraction optical element located between the objective lens and the optical recording medium and for changing one of the phase and intensity of the light so that the light spot size can be reduced by Fresnel diffraction phenomenon, thereby diffracting the light focused by the objective lens.

As described above, according to the present invention, the diffraction optical element such as a shielding plate or a phase apodizer is installed at the exit side, not the entrance side of the objective lens, to thereby further diffract the light focused by the objective lens. In other words, the light focused to a diffraction limit can be diffracted by Fresnel diffraction, to thereby theoretically enable the formation of limitlessly small light spot.

BRIEF DESCRIPTION OF THE DRAWINGS

The above objects and other advantages of the present invention will become more apparent by describing in detail a preferred embodiment thereof with reference to the attached drawings in which:

FIG. 3 is a plan view showing an optical pickup adopting a swing arm system where the high density recording method of the present invention is applied;

FIG. 4 is a side view of the optical pickup shown in FIG. 3;

DETAILED DESCRIPTION OF THE INVENTION

Figure 2A:
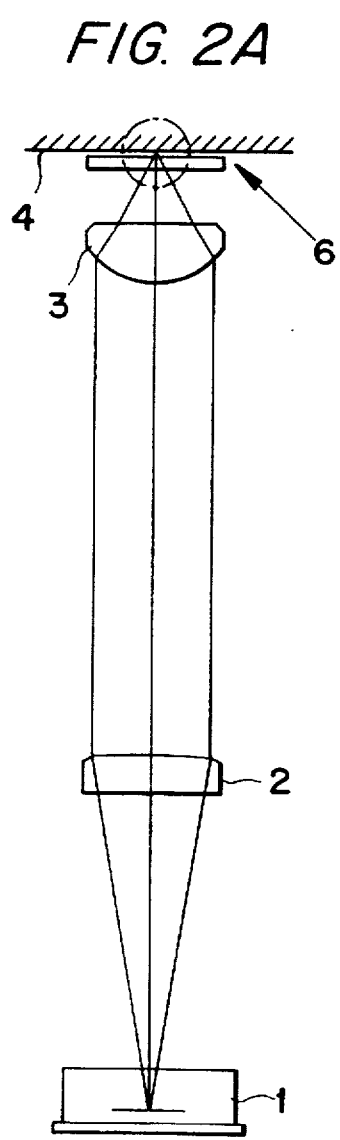
FIG. 2 is a layout for illustrating a high density optical recording method of the present invention (the circle shows an expanded extract view)
Figure 2B:
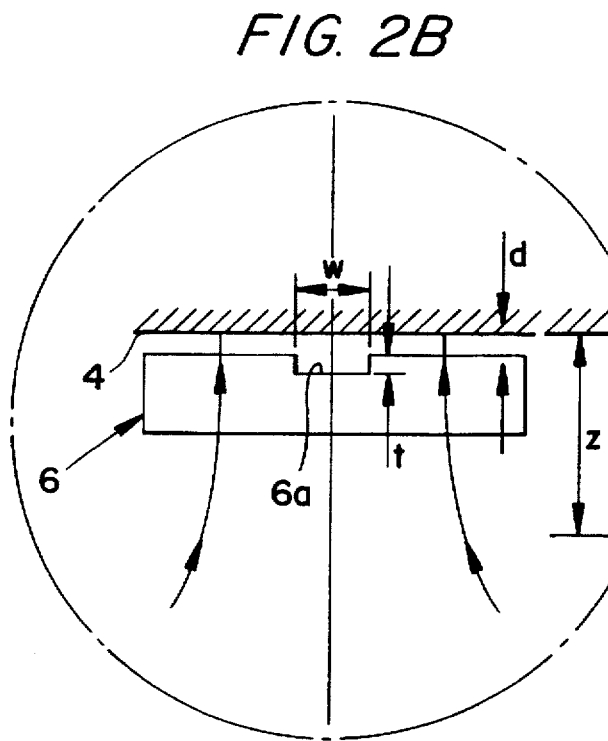

FIG. 2 is a layout of an optical device for performing high density recording according to an optical recording method of the present invention. The optical device is, for example, applied as a part of the optical pickup for use in recording and reproducing. As shown in FIG. 2, a light source 1, a collimating lens 2 and an objective lens 3 are disposed in order. In the present invention, a diffraction optical element 6 is installed between objective lens 3 and an optical disk 4 to which light is focused by objective lens 3. Diffraction optical element 6 is located within optical focal length of objective lens 3 and for diffracting the light focused at the diffraction limit by objective lens 3.

Referring to FIG. 2, diffraction optical element 6 is employed as a phase apodizer for spatially controlling the phase of the light being focused, and has a groove 6a on the surface facing optical disk 4 for performing a phase shifting. Groove 6a has a width (w), which is the diameter of the desired light spot. It is desirable that groove 6a has the same depth (t) the same as the wavelength of the light for a maximum diffraction effect. Diffraction optical element 6 partially changes the phase of the light focused at the diffraction limit by objective lens 3, and then the phasechanged light is diffracted to be focused onto optical disk 4 as a new light spot. The distribution of intensity of the light spot formed on optical disk 4 differs depending on distance (d) between optical disk 4 and diffraction optical element 6.

In order to simulate distributions of optical intensity of embodiments of the present invention, width (w) of groove 6a in the circle of FIG. 2 was formed to a half of the diameter of objective lens 3 within the optical focal length of objective lens 3, the phase difference between the central portion of the light passing through groove 6a and the remaining portion thereof was set 180°, and distance (d) between optical disk 4 and diffraction optical element 6 was set a quarter, half, three quarters and the same as the light wavelength. Results of the simulation are respectively shown in FIG. 6 to FIG. 9. As can be seen from the simulation results, the light spot having a diameter close to width (w) of groove 6a of diffraction optical element 6 is formed onto an image forming surface of the disk when diffraction optical element 6 is installed sufficiently close to optical disk 4 within the optical focal length. The light spot size can be further reduced by reducing width (w) of groove 6a for a phase shifting of diffraction optical element 6.

Figure 1:
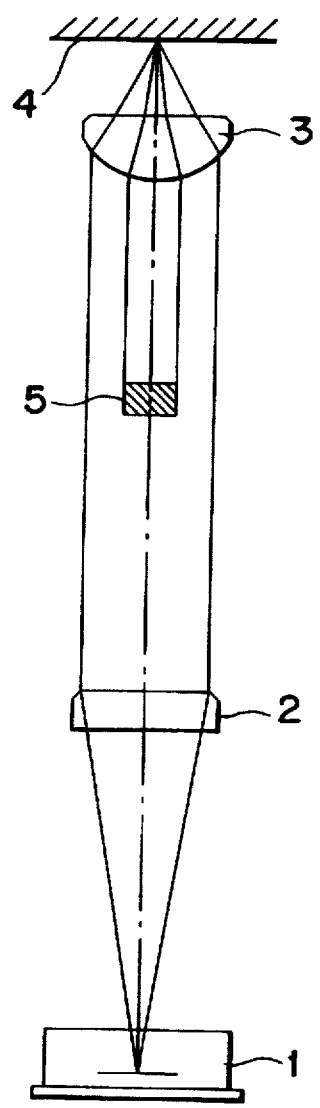
FIG. 1 is a layout for illustrating a conventional high density optical recording method employing a shielding plate.

Alternatively, diffraction optical element 6 may be formed of a shielding plate 5 as shown in FIG. 1 for partially shielding a distribution of light, to achieve the substantially same effect as described above.

Figure 5:
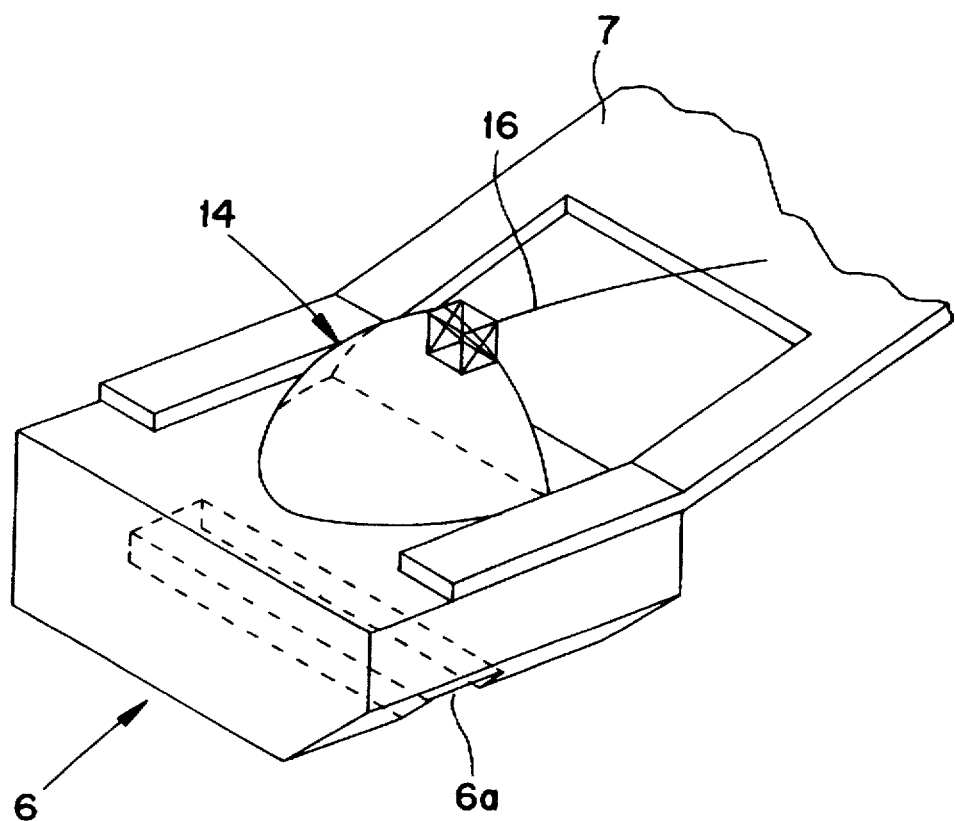
FIG. 5 is a partial perspective view of the optical pickup shown in FIG. 3.
Figure 6:
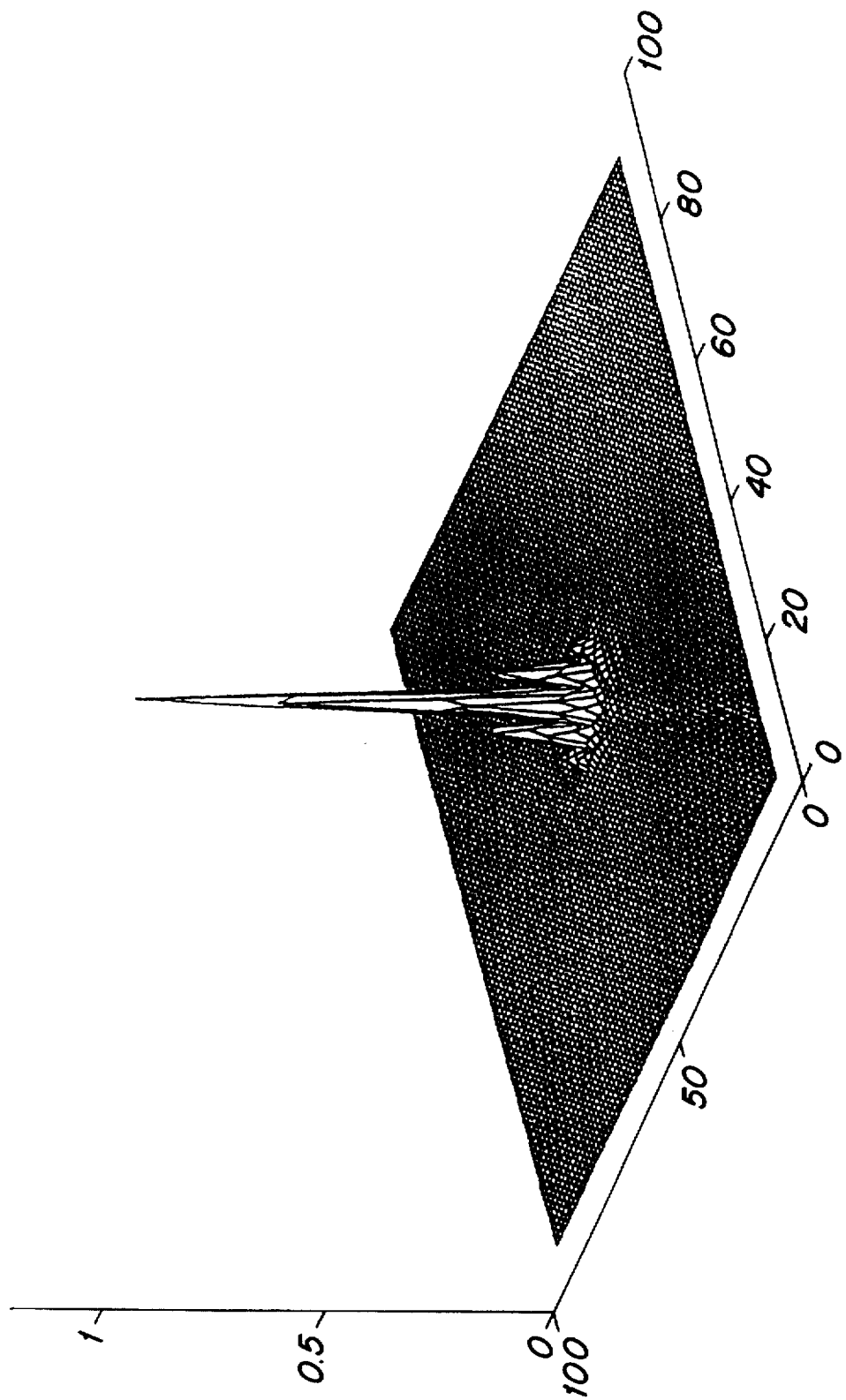
FIG. 6 is a three-dimensional graph showing distribution of optical intensity of a light spot at an image forming surface when the distance between a diffraction optical element and the image forming surface is a quarter of the light wavelength, in the high density optical recording method according to the present invention.
Figure 7:
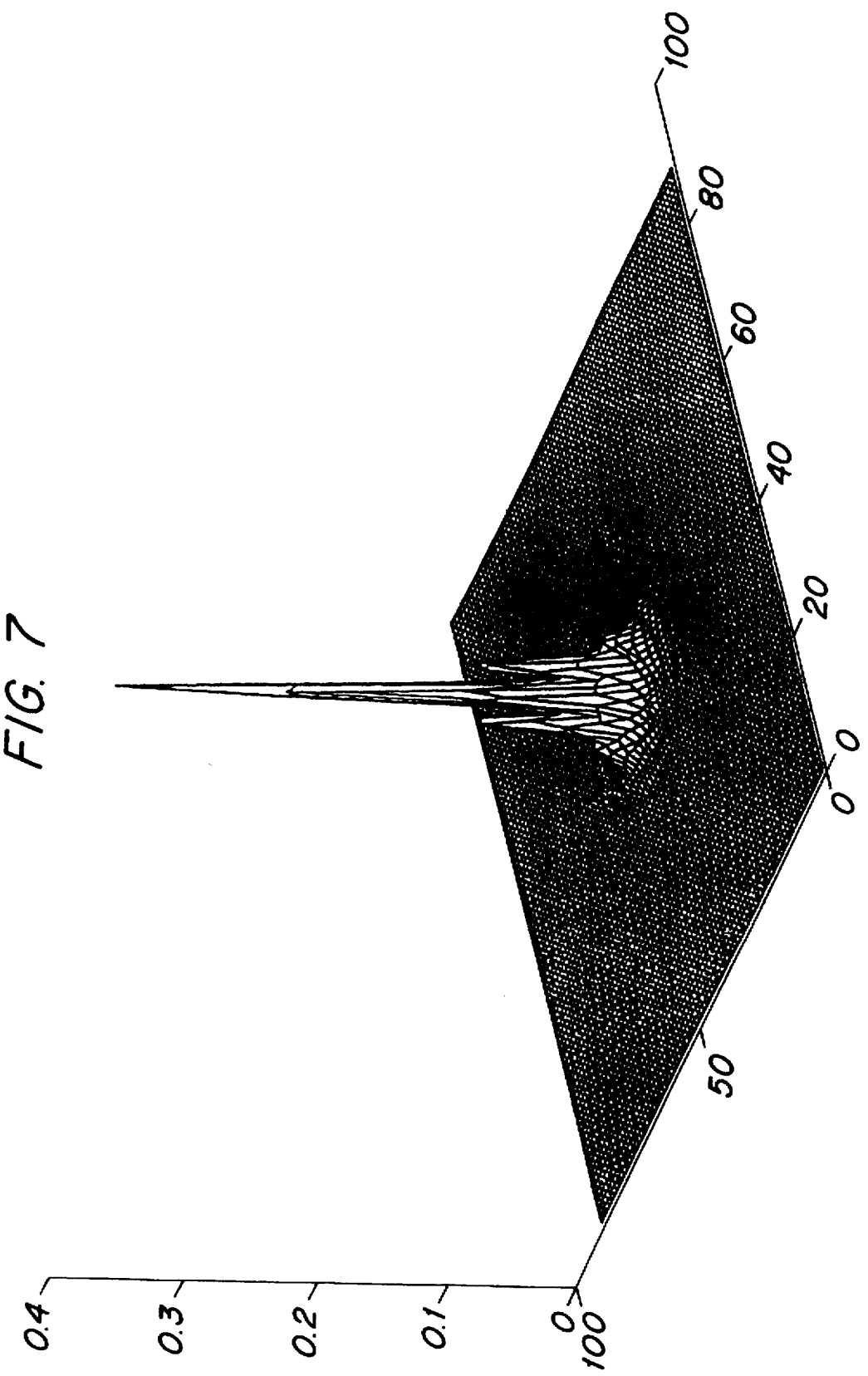
FIG. 7 is a three-dimensional graph showing distribution of optical intensity of a light spot at an image forming surface when the distance between the diffraction optical element and the image forming distance is half of the light wavelength, in the high density optical recording method according to the present invention.
Figure 8:
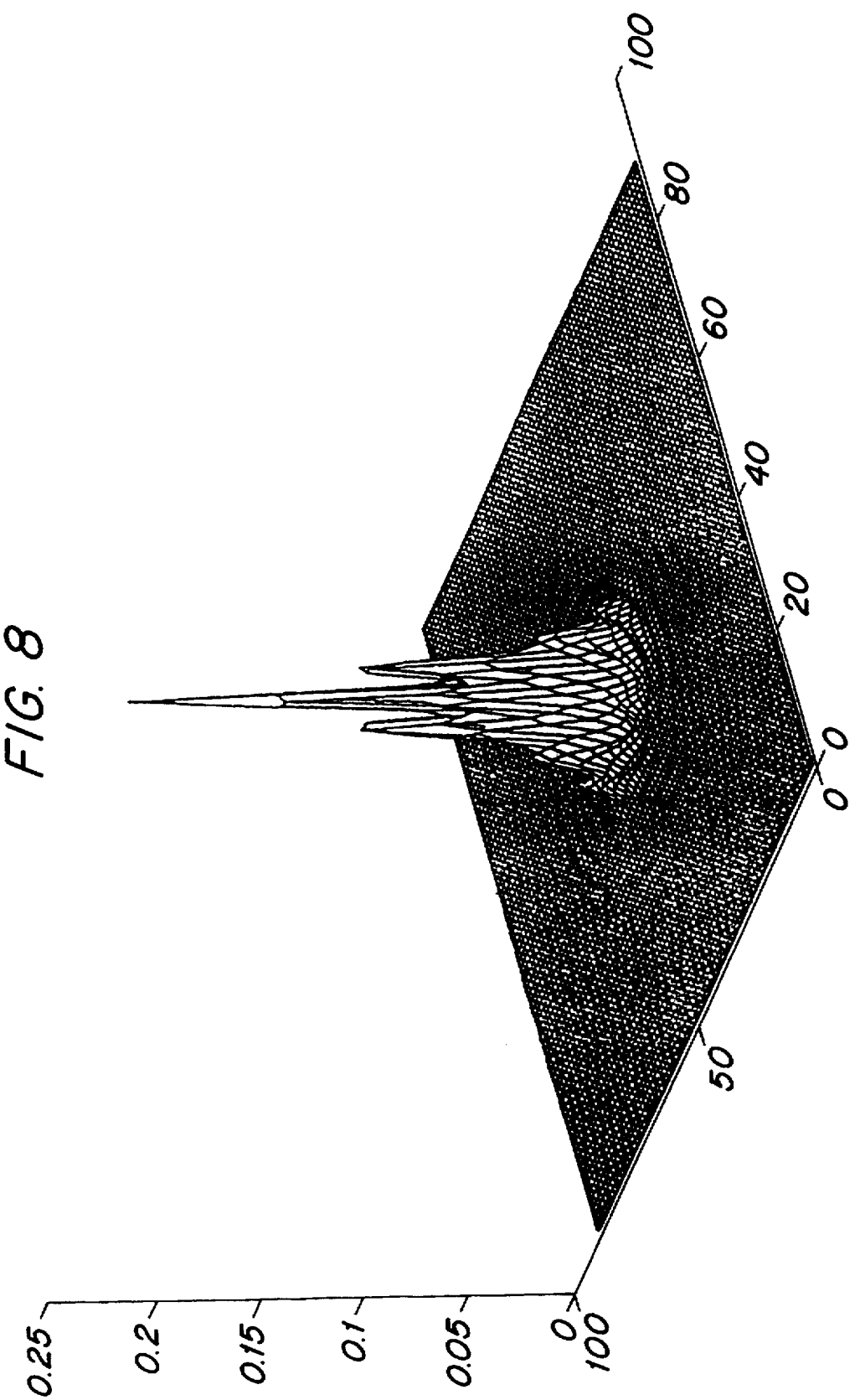
FIG. 8 is a three-dimensional graph showing distribution of optical intensity of a light spot at an image forming surface when the distance between the diffraction optical element and the image forming surface is three quarters of the light wavelength, in the high density optical recording method according to the present invention.
Figure 9:
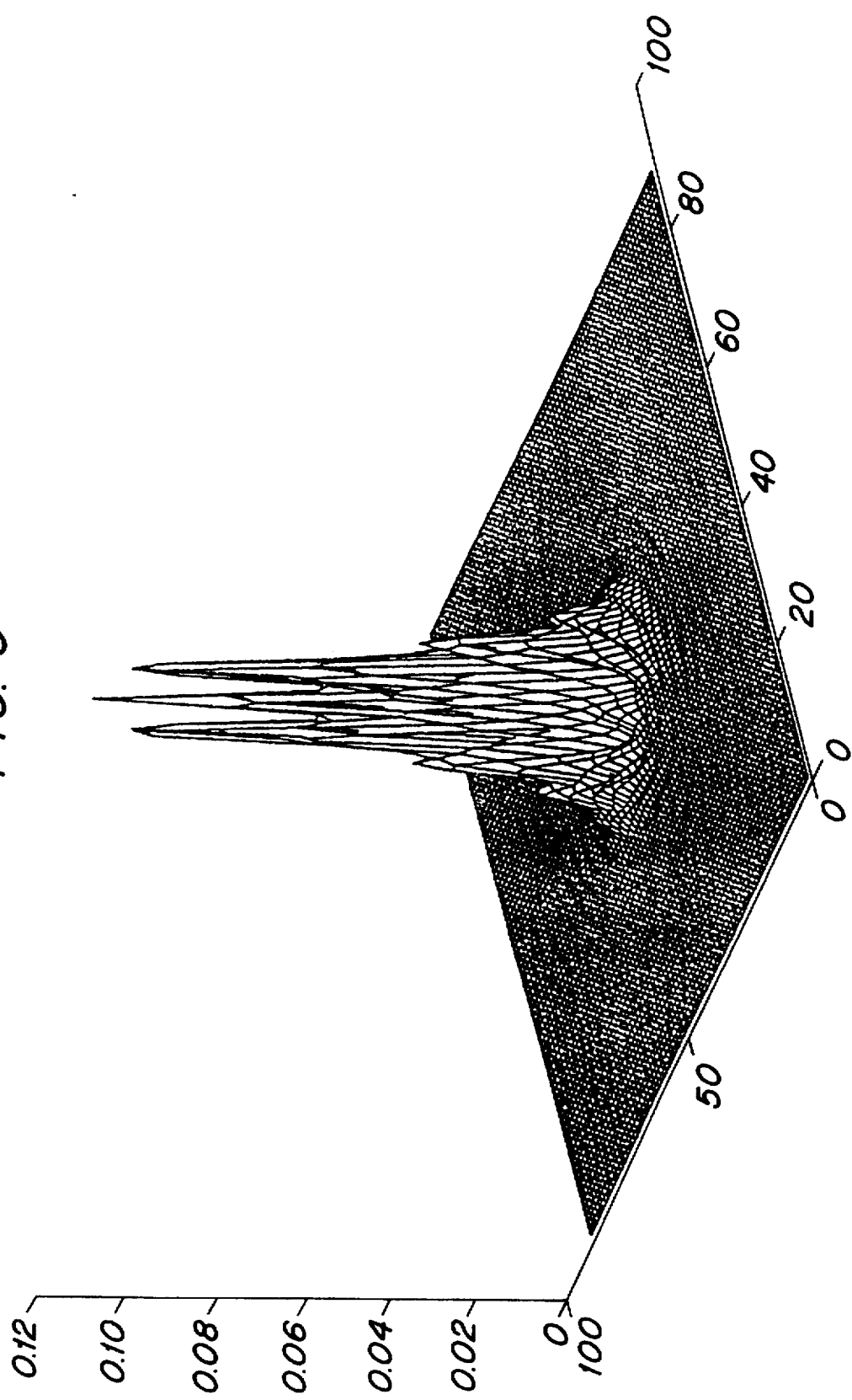
FIG. 9 is a three-dimensional graph showing distribution of optical intensity of a light spot at an image forming surface when the distance between the diffraction optical element and the image forming surface is the same as the light wavelength, in the high density optical recording method according to the present invention.

FIG. 3 to FIG. 5 show high density optical recording apparatus of the present invention using the above-described method, and which is applied to a compact recording and reproducing apparatus with a swing arm. One end of swing arm 7 is connected to a rotation actuator 8 and rotates within a predetermined angle. Rotation actuator 8 comprises of a rotating plate 9 having a supporting shaft 10, a driving coil 11 attached to rotating plate 9, a permanent magnetic 12 for generating magnetic flux to be applied to driving coil 11 and a yoke 13 in which the flux flows. The other end of swing arm 7 supports diffraction optical element 6. A mirror 14 is attached as an objective lens to diffraction optical element 6. Mirror 14 includes a light entrance surface 14a and a light exit surface 14b which are perpendicular to each other, and a reflecting surface 14c which is formed by extending the portion around light entrance surface 14a and light exit surface 14b into a spherical, oval or non-spherical shape. Reflecting surface 14c reflects light passing through light entrance surface 14a to be focused onto optical disk 4 via light exit surface 14b and thus functions as the objective lens. A beam splitter 15 is attached onto light entrance surface 14a of mirror 14. An optical fiber 16 and an optical detector 17 each are attached onto beam splitter 15. Optical fiber 16 is wired along swing arm 7 and optically connected to an exterior light source (not shown). Such an optical pickup is disclosed in detail in the co-pending U.S. patent application Ser. No. 08/365,824 which was filed on Dec. 29, 1994 by the present applicant.

Groove 6a of diffraction optical element 6 is formed in the direction of rotation of swing arm 7 which is identical with the radial direction of optical disk 4. Thus, an air cushion is formed between swing arm 7 and optical disk 4 when the swing arm rotates so that diffraction optical element 6 actually floats on optical disk 4, to thereby enable noncontact of diffraction optical element 6 from optical disk 4. That is, diffraction optical element 6 performs the function of a floating slider for the optical head as well as spatial controlling of the phase of light, for high density recording.

According to the present invention, a light focused at the diffraction limit of an objective lens (or mirror) is diffracted to form an image by Fresnel diffraction, so that forming a limitlessly small light spot is theoretically enabled. However, in practice, the light spot is reduced approximately to a half to one-tenth, dependent on efficient use of the light source and the distance between the diffraction optical element and the image forming surface of the optical disk. It is expected that the recording density of an optical recording medium will be increased by four to a hundred times.

In the present invention, nearly no cost for material is added to that of a conventional optical pickup system, and the arrangement and size thereof are not greatly changed, to thereby make its application easy.

What is claimed is:

1. A high density optical recording method for performing high density optical recording comprising the steps of:

focusing light from a light source using an objective lens to form a light spot on an optical recording medium; and diffracting said light being focused by said objective lens by employing a diffraction optical element located between the objective lens and the optical recording medium without intervening optical elements for controlling one of the phase and the intensity of said light being focused by said objective lens.

2. A high density optical recording method for performing high density optical recording comprising the steps of:

focusing light from a light source using an objective lens to form a light spot on an optical recording medium; and diffracting said light being focused by said objective lens by employing a phase apodizer placed between said objective lens and optical recording medium so as to change the phase of said light, said phase apodizer having a groove with a predetermined width and depth.

3. A high density optical recording method for performing high density optical recording comprising the steps of:

focusing light from a light source using an objective lens to form a light spot on an optical recording medium; and diffracting said light being focused by said objective lens by employing a phase apodizer placed within the optical focal length of said objective lens.

4. A high density optical recording method according to claim 2, wherein said phase apodizer is placed within the optical focal length of said objective lens.

5. A high density optical recording method according to claim 1, further comprising the step of providing a supporting means to hold said diffraction optical element.

6. A high density optical recording method according to claim 5, wherein said step of providing a supporting means includes forming a swing arm to hold said diffraction optical element.

7. A high density optical recording apparatus including:
a light source;
an objective lens for focusing a light spot from light generated from said light source onto an optical recording medium; and
a diffraction optical element for spatially controlling one of the phase and the intensity of said light being focused by said objective lens to diffract said light being focused by said objective lens, said diffraction optical element being located between the objective lens and the optical recording medium without intervening optical elements.

8. A high density optical recording apparatus including:
a light source;
an objective lens for focusing a light spot from light generated from said light source onto an optical recording medium; and
a diffraction optical element for spatially controlling one of the phase and the intensity of said light being focused by said objective lens to diffract said focused by said objective lens, wherein said diffraction optical element includes a phase apodizer having a groove with a predetermined width and depth placed between said objective lens and optical recording medium so as to change the phase of said light.

9. A high density optical recording apparatus including:
a light source;
an objective lens for focusing a light spot from light generated from said light source onto an optical recording medium; and
a diffraction optical element for spatially controlling one of the phase and the intensity of said light being focused by said objective lens to diffract said light being focused by said objective lens, wherein said diffraction optical element includes a phase apodizer placed within the optical focal length of said objective lens.

10. A high density optical recording apparatus according to claim 8, wherein said phase apodizer is placed within the optical focal length of said objective lens.

11. A high density optical recording apparatus according to claim 7, which includes supporting means attached to said diffraction optical element.

12. A high density optical recording apparatus according to claim 11, wherein said supporting means having a swing arm supporting said diffraction optical element.

13. A high density optical recording apparatus including a light source, an optical means for focusing a light generated from the light source onto an optical recording medium and receiving reflected light from said optical recording medium, a swing arm for supporting said optical means and an actuator for rotating said swing arm, said high density optical recording apparatus comprising a diffraction optical element supported by said swing arm so as to face said optical recording medium and optically combined with said optical means so as to spatially control one of the phase and the intensity of the light being focused by said optical means onto said optical recording medium.

14. A high density optical recording apparatus according to claim 13, wherein said diffraction optical element is a phase apodizer having a groove with a predetermined width and depth on a surface thereof facing said optical recording medium so as to change the phase of said light.

15. A high density optical recording apparatus according to claim 14, wherein said groove is formed in a direction in which said swing arm rotates so that said phase apodizer floats above said optical recording medium by an air cushion formed between said groove and optical recording medium when said swing arm rotates.

16. A high density optical recording apparatus according to claim 13, further comprising an optical fiber wired along said swing arm and for optically connecting said optical means with said light source.

17. A high density optical recording apparatus according to claim 13, wherein said optical means comprises a mirror having a light entrance surface and a light exit surface which are perpendicular to each other and a reflecting surface formed by expanding peripheral portions of said light entrance surface and light emitting surface and for reflecting light passing through said light entrance surface to be focused onto said optical recording medium via said light exit surface.

18. A high density optical recording apparatus according to claim 16, wherein said optical means comprises a mirror having a light entrance surface and a light exit surface which are perpendicular to each other and a reflecting surface formed by expanding peripheral portions of said light entrance surface and light emitting surface and for reflecting light passing through said light entrance surface to be focused onto said optical recording medium via said light exit surface.

19. A high density optical recording apparatus according to claim 17, wherein said reflecting surface is spherical, non-spherical or oval.

20. A high density optical recording apparatus according to claim 18, wherein said reflecting surface is spherical, non-spherical or oval.

\* \* \* \* \*